(12) United States Patent
Limcaco

(10) Patent No.: US 9,380,766 B2
(45) Date of Patent: Jul. 5, 2016

(54) AQUACULTURE SYSTEM

(71) Applicant: Christopher A. Limcaco, Greenwood, IN (US)

(72) Inventor: Christopher A. Limcaco, Greenwood, IN (US)

(*) Notice: Subject to any disclaimer, the term of this patent is extended or adjusted under 35 U.S.C. 154(b) by 0 days.

(21) Appl. No.: 14/663,851

(22) Filed: Mar. 20, 2015

(65) Prior Publication Data

US 2015/0264897 A1  Sep. 24, 2015

Related U.S. Application Data

(60) Provisional application No. 61/968,432, filed on Mar. 21, 2014.

(51) Int. Cl.
*A01K 63/00* (2006.01)
*A01K 61/00* (2006.01)
*A01K 63/04* (2006.01)

(52) U.S. Cl.
CPC .............. *A01K 61/00* (2013.01); *A01K 63/04* (2013.01)

(58) Field of Classification Search
CPC ... A01K 63/04; A01K 63/042; A01K 63/045; A01K 61/00; A01K 61/003
USPC ...................... 119/224, 225; 47/1.4
See application file for complete search history.

(56) References Cited

U.S. PATENT DOCUMENTS

| | | | | |
|---|---|---|---|---|
| 4,043,299 A * | 8/1977 | Birkbeck | ............... | A01K 63/04 119/227 |
| 4,052,960 A * | 10/1977 | Birkbeck | ................. | C02F 1/78 119/227 |
| 5,647,983 A | 7/1997 | Limcaco | | |
| 5,755,961 A | 5/1998 | Limcaco | | |
| 6,117,313 A | 9/2000 | Goldman et al. | | |
| 6,158,386 A | 12/2000 | Limcaco | | |
| 7,736,508 B2 * | 6/2010 | Limcaco | ................ | C02F 3/082 210/602 |
| 7,794,590 B2 * | 9/2010 | Yoshikawa | ............ | A01K 63/04 119/260 |
| 8,117,992 B2 | 2/2012 | Parsons et al. | | |
| 2009/0152192 A1 | 6/2009 | Michaels, II et al. | | |
| 2009/0230037 A1 | 9/2009 | Stähler et al. | | |
| 2011/0290189 A1 | 12/2011 | Myers | | |

FOREIGN PATENT DOCUMENTS

EP  2 236 466 A1  6/2010

OTHER PUBLICATIONS

International Search Report and Written Opinion corresponding to PCT/US2015/21698, mailed Jul. 2, 2015 (9 pages).

* cited by examiner

*Primary Examiner* — Joshua Huson
(74) *Attorney, Agent, or Firm* — Maginot, Moore & Beck, LLP

(57) ABSTRACT

A recirculating aquaculture system is configured for growing aquatic animals. The system includes an inlet conduit, a tank, a water treatment unit, a clarifier, and an outlet conduit. The tank is in fluid communication with the inlet conduit to receive water displaced from the inlet conduit. The tank also contains water and aquatic animals. The water treatment unit is arranged within the tank and includes algae capable of removing aquatic animal waste from the water within the tank. The clarifier is in fluid communication with the tank to receive displaced water from the tank. The clarifier is also configured to remove solid waste from the displaced water. The outlet conduit is in fluid communication between the clarifier and the inlet conduit.

17 Claims, 5 Drawing Sheets

AQUACULTURE SYSTEM

REFERENCE TO RELATED APPLICATION

This application is a non-provisional of and claims priority to Provisional Application No. 61/968,432, filed on Mar. 21, 2014, the entire disclosure of which is incorporated herein by reference.

BACKGROUND

As the world's population grows and oceans are overfished and polluted, aquaculture will be necessary to meet future demands for fresh and safe seafood. However, current aquaculture systems are not sustainable for several reasons. The technology currently used in most intensive recirculating aquaculture systems (RAS) requires large amounts of energy to operate, are labor intensive and require constant operator attention. Extensive open pond and natural systems require too much land and cannot be controlled to prevent pollution from rain and runoff. Extensive RAS systems cannot be cost effectively enclosed and must be constructed in warm climates.

As a result, both intensive and extensive aquaculture systems utilizing conventional technologies simply cannot compete with wild caught seafood or pond raised seafood from countries with very low labor costs and warm climates. Companies in today's aquaculture business must compete with these market prices and will not be given a premium for farm raised fish even though they can show that the fish are more healthy and safer to eat than wild-caught and open pond raised seafood. To the contrary aquaculture businesses would have to sell their product at a discount in order to compete in the market. This is impossible using current RAS technology and extensive pond systems as long as seafood prices remain at or near their current level. Consequently, there is a need for an aquaculture system that can be competitive with wild-caught and open pond raised seafood.

SUMMARY

In one aspect of the present disclosure, an aquaculture system is provided that combines the benefits of extensive natural pond systems with the benefits of closed loop intensive systems. In one aspect, the present aquaculture system uses an ALGAEWHEEL® system as disclosed in U.S. Pat. Nos. 5,647,983; 5,755,961; and 6,158,386, the disclosures of which are incorporated herein by reference. Like natural pond systems, the ALGAEWHEEL® system utilizes light as energy to grow algae and plankton from the fish waste to significantly offset the amount of manmade feed required to raise the fish. The ALGAEWHEEL® system produces excess algae to raise algae eating fish, shrimp, and plankton reducing the need for artificial feed. These algae, fish, shrimp, and plankton can either be harvested for human consumption or fed back to carnivorous fish being raised to increase the overall food to mass ratio. By using light energy, water, and $CO_2$ in the air and fish respiration, an aquaculture system incorporating the ALGAEWHEEL® system grows a crop of low cost fish and shrimp food while simultaneously treating the system water to maintain optimum growing conditions for the fish.

In one feature of the aquaculture system described herein, the ALGAEWHEEL® system uses light, powers a photosynthetic algae and plankton production eco-system. The ALGAEWHEEL® system can use natural sunlight by housing the system in a greenhouse structure or artificial light such as metal halides, LED, or fluorescent lights. One advantage of using artificial lighting is that the ALGAEWHEEL® system can be housed in almost any type of building structure allowing the aquaculture facility to be located almost anywhere, regardless of ambient weather conditions.

The use of the ALGAEWHEEL® system in the aquaculture system disclosed herein also incorporates the benefits of intensive fish farming by providing a completely closed loop aquaculture environment. The three-dimensional ALGAEWHEEL® system carries an equivalent biological community hundreds of times greater than the two-dimensional footprint of the system due to the geometric shape of the ALGAEWHEEL® fins, the internal bio-media section, and the algae growing on the fins. This allows the ALGAEWHEEL® system to maintain much higher fish and shrimp densities than an extensive pond or natural waterway system with the same footprint, thus reducing costs and allowing the system to be cost effectively enclosed in a building structure. This also allows the ALGAEWHEEL® system to be located in almost any climate unlike natural systems that can only be located in warm climates. Furthermore, the ALGAEWHEEL® system can therefore be located economically in a more localized decentralized manner throughout the country versus huge centralized fish farms in warmer climates. This eliminates issues with transportation, having to freeze the fish, and even allows delivery of live fish to local restaurants the same day they are harvested.

The ALGAEWHEEL® system creates a more natural ecosystem by incorporating both algae and bacteria. The algae use the $CO_2$ generated by the bacteria and produce oxygen. The bacteria use the oxygen created by the algae and produce $CO_2$. Both organisms simultaneously remove nutrients from the water in a very efficient symbiotic relationship. The oxygen produced by the algae also reduces the amount of supplemental oxygen required from aeration devices.

Another major problem with conventional bacteria based systems is that they strip all of the organics from the system water through intense filtration and disinfection, either ozone or ultraviolet or both. In natural systems, fish generate a slime coat which operates as an immune system to help protect them from disease and parasites. This slime coat is created by bacteria, which need organics in the water to survive and grow. Conventional treatment systems strip out these organics preventing the bacteria from surviving and thus preventing the fish from creating their protective slime coat. As a result, conventional systems must continuously disinfect the system water because the fish are unable to protect themselves from disease and parasites. This is also the reason that only fish in captivity develop a condition called lateral line disease. The use of the ALGAEWHEEL® system in the aquaculture system disclosed herein produces the organics necessary for the bacteria to develop the slime coat for the fish. The need for additional disinfection through ozone or ultraviolet disinfection is eliminated with the present invention.

Current recirculating aquaculture systems use only bacteria in their life support systems to maintain adequate water quality for fish growth. Almost all RAS systems used for closed loop aquaculture intentionally prevent algae growth by housing the systems in tanks and buildings designed to block light. They also use ozone, ultraviolet disinfection, and algaecides to kill algae in the fish tanks and filters. Algae are considered a nuisance by many seafood producers using RAS closed loop systems. Alternatively, many pond producers promote algae growth by initially adding nutrients to the pond to promote algae blooms prior to adding the fish. Pond systems thus utilize algae as a food source for zooplankton that helps offset feed requirements for fish. However, these pond systems cannot handle the fish densities capable in RAS systems making them uneconomical in colder climates and areas where land is relatively expensive. Open ponds are also susceptible to many other problems including predation by birds and other animals, contamination from runoff, and weather. The biggest problem with open pond systems that eliminate them from being sustainable is the fact that they require over 100 times as much land as a recirculating aquaculture system.

Current RAS systems use massive amounts of energy to maintain water quality conditions for raising fish and other aquatic organisms. Typical components in RAS systems include biological filters, solids removal mechanical filter screens, aerators, ozone, and ultra-violet disinfection equipment, all of which require large amounts of power to operate. The present aquaculture system eliminates all of this equipment.

The aerators in conventional aquaculture systems need to provide air continuously to support both the fish and the bacteria that break down and remove the fish waste. The algal component of the ALGAEWHEEL® system produces oxygen through photosynthesis reducing the oxygen that has to be pumped into the system reducing overall power consumption.

Conventional aquaculture systems require sophisticated solids removal systems including mechanical screening equipment and sand filters because the solids generated in a bacteria only system are difficult to remove as most neither settle nor float. The algae on the ALGAEWHEEL® system create a natural polymer that coagulates the solids in the water and allows them to be very efficiently removed by simple gravity settling tanks. This reduces capital costs and operation and maintenance costs.

Most aquaculture systems also use centrifugal water pumps, which kill plankton and damage algae as they pass through the pump's impellers. Centrifugal water pumps also add significant amounts of heat to the water reducing dissolved oxygen levels and stressing the fish and other organisms. Centrifugal pumps also create electrical currents in the water causing stress to the fish and create hazardous working environments to the fish farm operators. The ALGAEWHEEL® system is essentially powered entirely by air and has no centrifugal water pumps eliminating all of these problems.

RAS systems all have external filters that require overflow boxes in the fish tank. The boxes are slotted to allow water to pass to the external biological filter while keeping the fish in the tank. These overflow boxes are high maintenance and routinely get clogged with debris causing tank overflows and reduced flow to the filters causing fish stress and death in some instances. Since the ALGAEWHEEL® system is located inside the fish tank, no overflow boxes are required for the biological filter eliminating the problems associated with these devices. The fish tank in the ALGAEWHEEL® system is equipped with an overflow to a simple settling tank for collection of solids to feed shrimp and crabs. However, the settling tank is only for solids collection and water quality and treatment by the biological filter will not be reduced if the overflow clogs since the ALGAEWHEEL® system are located within the fish tank.

Since the ALGAEWHEEL® system is located in the fish tank, the air used to power the system is multifunctional as it also provides aeration and mixing, so that additional air pumps are not required. The energy required in conventional systems to move the water from the fish tank to the filter and back to the fish tank is also eliminated.

Another benefit of locating the ALGAEWHEEL® system in the fish tank is that the ALGAEWHEEL® system shades the fish, reducing the stress caused by direct light in relatively shallow water. Fish in natural water bodies can escape direct sunlight by swimming into deeper waters or hiding under structures. In one aspect of the aquaculture system disclosed herein, the ALGAEWHEEL® system is intentionally exposed to direct light for more efficient photosynthesis while acting as shade structure for the fish to hide from intense light.

Another benefit of having the ALGAEWHEEL® system in the fish tank is that the additional area required for conventional external biological filters is eliminated. This decreases the footprint of the facility, which reduces capital cost as well as operation and maintenance costs such as heating and cooling. Also, since the ALGAEWHEEL® system is located within the fish tank, the risk of inadequate biological treatment and aeration is eliminated due to clogging or mechanical failure between the fish tank and external filtration system.

Most fish eat some level of algae, even mainly carnivorous fish. Since the ALGAEWHEEL® system is located in the fish tank, the fish can graze off of the ALGAEWHEEL® system and eat the plankton growing on the ALGAEWHEEL® system. This allows a less intensive feeding schedule compared to conventional RAS closed loop systems. Like natural pond systems, the fish in the ALGAEWHEEL® system can go for weeks without additional artificial feed. The herbivorous fish can go almost indefinitely just grazing the algae and plankton produced by the ALGAEWHEEL® system. Since this natural grazing on living algae (feed) reduces the amount of artificial feed, the nutrient loading is also reduced on the filter system improving overall water quality. The living algae feed does not decay like artificial feed and remains viable until eaten by the fish or shrimp.

Conventional bacteria based biological filters, such as sand filters, multi-media filters, trickling filters, and suspended growth filters, must be placed outside the fish tank because of their design and construction requirements. Even conventional rotating biological filters need to be placed outside of the fish tank because they require a cover to prevent algae growth for proper operation and as such could not be placed under light without a cover over the tank. Any cover over the tank would impede light into the tank eliminating the benefit of utilizing light to increase plankton production and reducing artificial feed requirements.

In accordance with one aspect of the aquaculture system disclosed herein, the ALGAEWHEEL® system replaces almost all of the conventional treatment processes associated with Recirculating Aquaculture Systems (RAS). The following list identifies the processes replaced by the ALGAEWHEEL® system:

1. Bacteria biological filter: The ALGAEWHEEL® system has an internal bio media which replaces the typical filter external to the fish tank.

2. Denitrification filter: The algae growing on the fins of the ALGAEWHEEL® system remove nitrogen from the water and convert it to more algal mass (food). The typical denitrification filter required by conventional RAS systems is eliminated.

3. Phosphorous filter: The algae growing on the fins of the ALGAEWHEEL® system remove phosphorous from the water and convert it to more algal mass (food). The typical chemical phosphorous removal process required by conventional RAS systems is eliminated.

4. Ultraviolet (U.V.)/Ozone Disinfection Systems: The algae growing on the fins of the ALGAEWHEEL® system create peroxides which provide natural disinfection of harmful bacteria and viruses eliminating the need for disinfection equipment required on conventional RAS systems.

DETAILED DESCRIPTION

Figure 1:
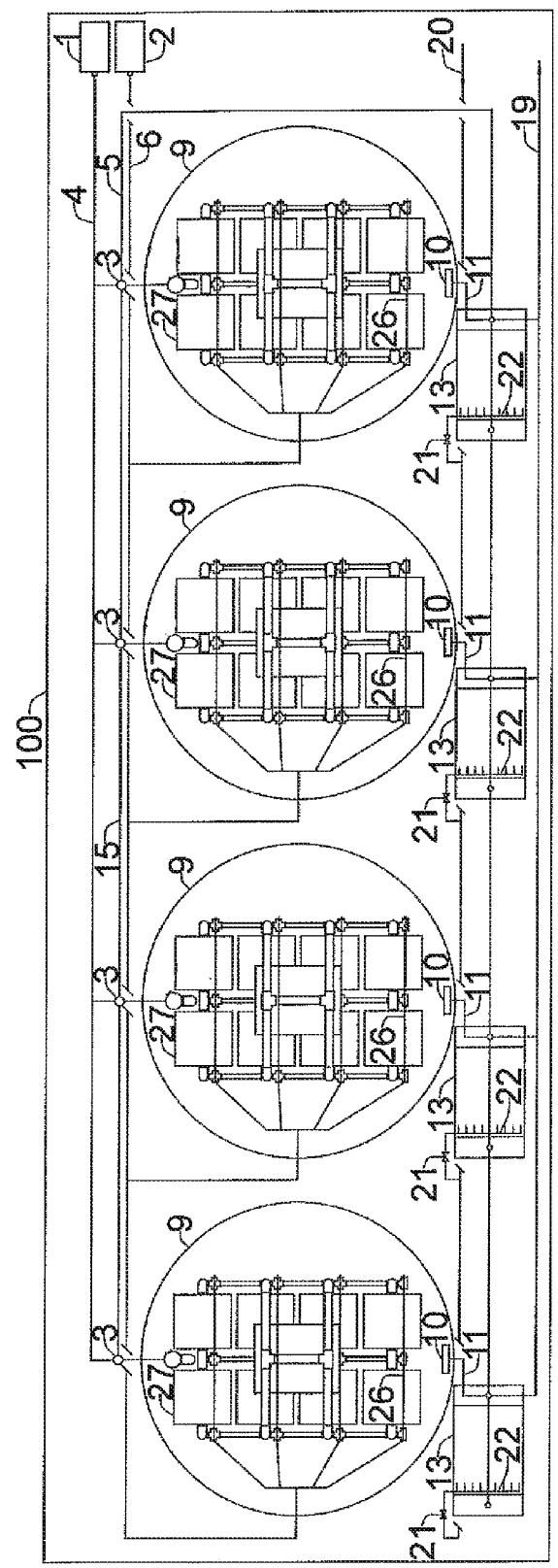
FIG. 1 is a plan view of an aquaponics facility according to one embodiment of the present disclosure.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

The present invention provides devices and systems which support natural-type ecosystems for raising fish and other aquatic life by controlling pH, oxygen, carbon dioxide concentration, nutrient availability and waste removal. An air pump provides wave generation and fluid movement to transfer fluid between multiple tanks in which fish and other aquatic life are being raised. This invention combines algae treatment, biological filtration, water movement, solids removal, oxygenation, de-gassing, and nutrient removal in one unit without the requirement of a water pump. The system is operated entirely from air, and the treatment devices of this invention attach easily to existing style aquaculture tanks without significant modifications. This invention is also compact and enables fish and other aquatic life to be raised in a wide variety of settings.

Previously, algae have had only limited success as treatment in RAS and aquaponics systems because algae requires long periods of light during growing time. Conventional RAS develop dark brown colored water due to tannins in artificial fish feed used to grow fish. The water becomes too dark to enable enough light to pass through to grow algae under water. Thus, growing algae in a conventional RAS requires treating the system water of the RAS with ozone to make the water clear enough for algae to grow underwater. Treating the system water of the RAS with ozone is not only cost prohibitive, but also creates toxic by-products which harm the fish, create residual ozone that irritates and can be lethal to fish, and create a hazardous working environment for the people working at the RAS facility. However, if algae is moved into and out of the RAS water, periodically exposing the algae to light, algae will grow profusely, enabling the algae to clean the RAS water and create a food by-product from fish waste that can be used for human consumption or used to raise other herbivorous fish or shrimp.

RAS also require large quantities of oxygen to keep the system water clean and to provide oxygen for the fish and bacteria. Algae can provide significant amounts of oxygen, which reduces the amount of oxygen that must be added to the system by air pumps. The oxygen released into the water by algae also contributes materially to the removal of solids from the system water. It has been found that if a small amount of dissolved oxygen is introduced into settling water solids, the solids settle far more quickly and the solids coagulate better, cohere better and are freely drainable so that they can be dewatered and dried much more efficiently. The algae also produce natural polymers which further increase coagulation and coherence of the solids allowing them to be removed in very small and simple clarifiers that otherwise would not work in a typical RAS. The natural polymers produced by the algae are also used by bacteria to grow and create the protective slime coat on fish. Conventional RAS do not have these polymers and thus the fish in conventional RAS do not develop proper slime coats to protect them from bacteria, viruses, and disease. The algae also produce pure $O_2$ and oxidants which act as natural disinfectants and eliminate the need for ultraviolet or ozone disinfection.

Figure 2:
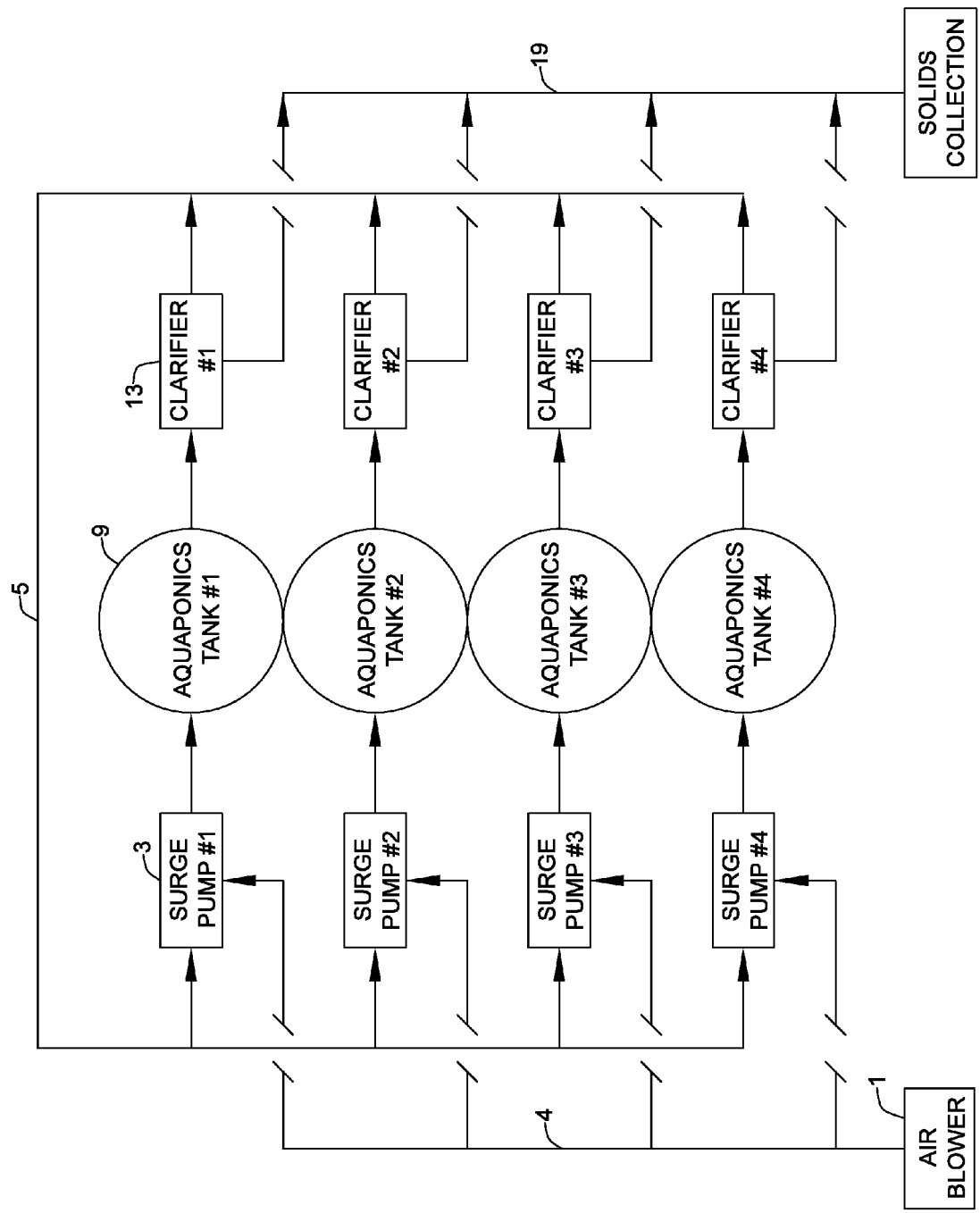
FIG. 2 is a process flow schematic of the aquaponics facility shown in FIG. 1.
Figure 3:
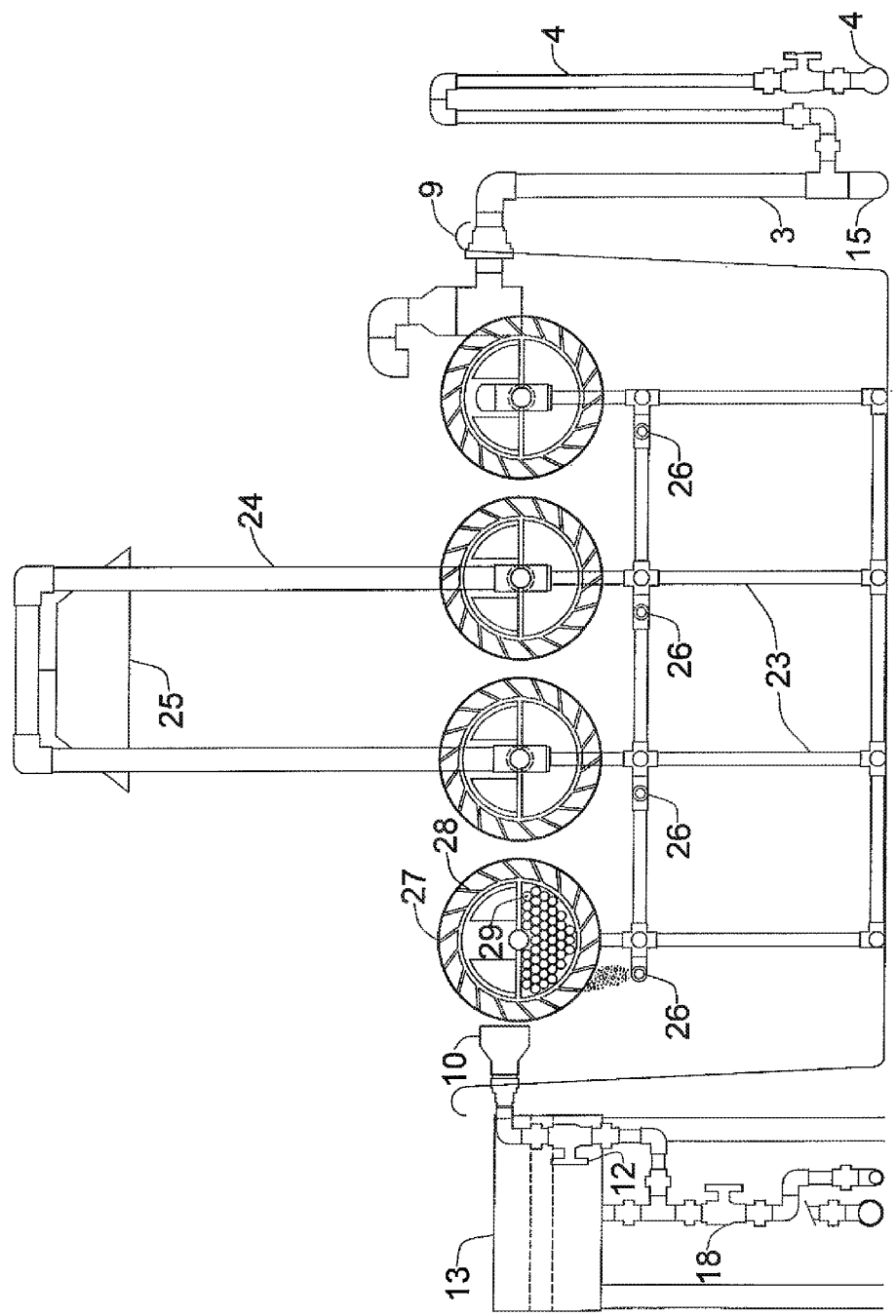
FIG. 3 is an end cross-section view of an aquaponics tank, ALGAEWHEEL® system, and clarifier used in the aquaponics facility shown in FIG. 1.
Figure 4:
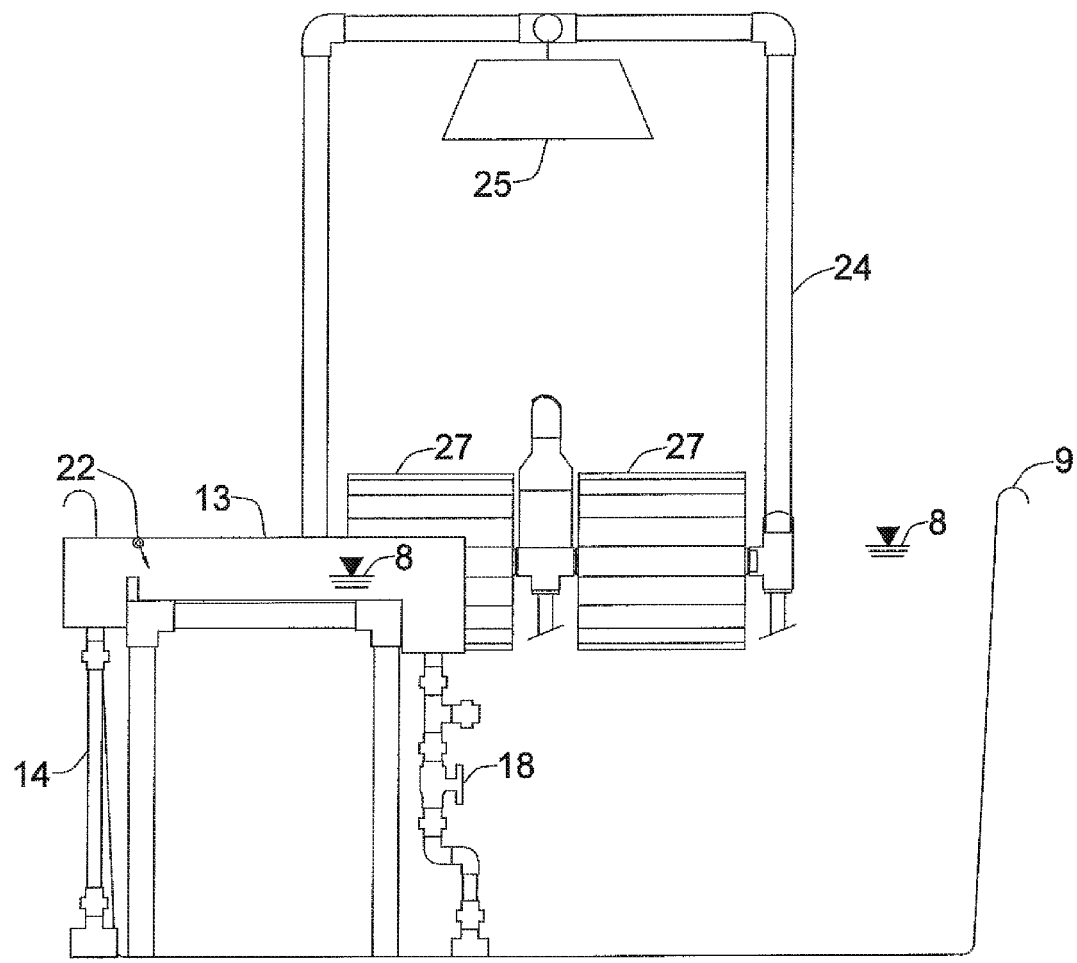
FIG. 4 is a side section view of an aquaponics tank, ALGAEWHEEL® system, and clarifier used in the aquaponics facility shown in FIG. 1.
Figure 5:
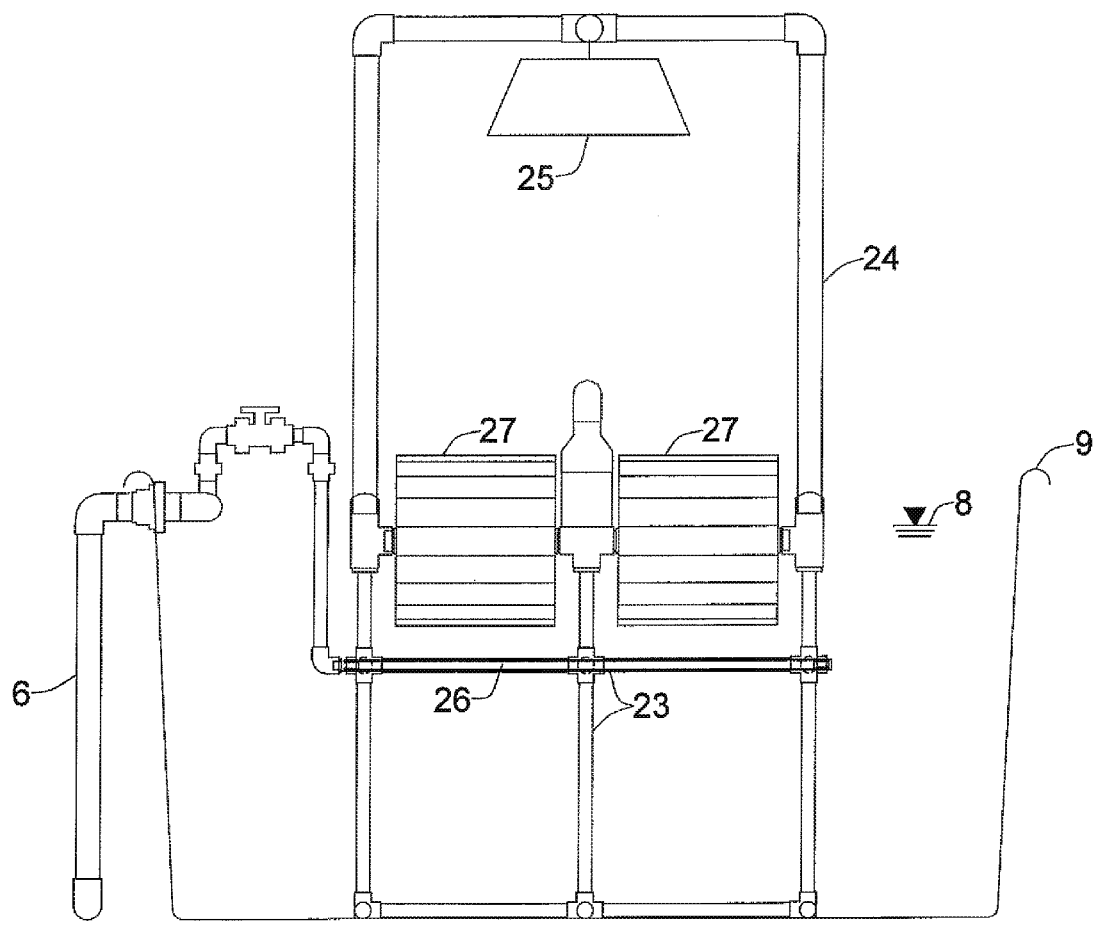
FIG. 5 is another side section view of an aquaponics tank and ALGAEWHEEL® system used in the aquaponics facility shown in FIG. 1.

Referring to FIGS. 1-5, in accordance with one embodiment of the present invention, a facility 100 includes a plurality of tanks 9 configured to retain water and other fluids and a water treatment unit. The water treatment unit is configured to support the growth of algae thereon, the algae capable of continuously removing animal waste from water within a tank 9 and providing oxygen to the water within the tank 9. The water treatment unit is air driven. The water treatment unit within each tank 9 includes at least one media wheel 27 rotatably supported by a support assembly 23 within the tank 9 such that the at least one media wheel 27 is partially submerged within the water and other fluids retained in the tank 9. When the at least one media wheel 27 rotates, each portion of the at least one media wheel 27 is alternately submersed into and raised out of the water and other fluids retained in the tank 9. In one embodiment, the facility 100 can include four tanks 9. However, it is possible for a facility to include more or fewer than four tanks 9. In one embodiment, the water treatment unit within each tank 9 includes eight media wheels 27. However, it is possible for the water treatment units within the tanks 9 to include more or fewer than eight media wheels 27.

The media wheels 27 and the support assemblies 23 provide shade and shelter to fish and other aquatic life within the tanks 9. The ability of the fish and other aquatic life to find shade and shelter and to have structures to swim between reduces stress on the fish and aquatic life within the tanks 9. In some embodiments, the support assemblies 23 can also support a light support assembly 24 and/or a light fixture 25 for each tank. These structures provide additional shade and shelter to the fish and aquatic life within the tanks 9 as well as providing a light source for the tanks 9.

The facility 100 further includes a surge pump air supply blower 1, which is coupled to a surge pump air supply line 4. The surge pump air supply line 4 is coupled to a surge pump 3 associated with each tank 9. Accordingly, in embodiments where the facility 100 includes four tanks 9, the surge pump air supply line 4 is coupled to four surge pumps 3. The surge pump air supply blower 1 is configured to force air through the surge pump air supply line 4 and into each of the surge pumps 3 sequentially.

The facility 100 further includes a water return line 5, which is also coupled to each of the surge pumps 3. Each of the surge pumps 3 is configured as an airlift pump. Accordingly, when air is forced through one of the surge pumps 3, the air mixes with water from the water return line 5 and the air and water mixture are forced into the same surge pump 3. The forced air and water mixture pass through the surge pump 3 and into the respective tank 9. Accordingly, water that is pumped into the tank 9 is oxygenated by the air from the surge pump air supply blower 1.

The facility 100 further includes a water treatment unit air supply blower 2, which is coupled to a water treatment unit air supply line 6. The water treatment unit air supply line 6 is coupled to water treatment unit air diffusers 26 positioned within each tank 9 adjacent to each water treatment unit. The water treatment unit air supply blower 2 is configured to force air through the water treatment unit air supply line 6 and into each tank 9 via each water treatment unit air diffuser 26.

As mentioned above, the water treatment unit within each tank 9 in the facility 100 includes the media wheels 27 supported by the support assembly 23. Each media wheel 27 can be, for example, an ALGAEWHEEL® including a plurality of fins 28 and a biological media 29 retained within a body of the media wheel 27. The fins 28 are configured and arranged to capture air between each fin 28 and an adjacent fin 28 to rotate the media wheel 27. The water treatment unit air diffusers 26 are positioned beneath the media wheels 27 within the water and fluid in the tanks 9 such that as the air supplied by the water treatment unit air supply blower 2 is released from the water treatment unit air diffusers 26, the air forms bubbles within the fluid in the tank 9 and are caught between the fins 28 as they rise upwardly. Thus, the water treatment unit air diffusers 26 release air which rotates the media wheels 27.

The facility 100 further includes a tank flow outlet screen 10 associated with an outlet of each of the tanks 9. Each tank flow outlet screen 10 is arranged and configured relative to the respective tank 9 such that water and other fluids will flow by gravity out of the tank 9 and through the tank flow outlet screen 10. Each tank flow outlet screen 10 is coupled to a tank flow outlet line 11, which carries the water and other fluids to a solids removal clarifier 13. Each tank 9 has an associated solids removal clarifier 13. The solids removal clarifiers 13 are configured to separate the water and other fluids from the tank 9 into a solid waste component and a liquid component. The solid waste components are removed from each clarifier 13 via a clarifier solids drain valve 18 which is connected to a common clarifier solids drain line 19. The liquid components from each clarifier 13 are released into a common clarified water return line 15 which is integrally formed with the water return line 5. Accordingly, the liquid components from each clarifier 13 are combined in the clarified water return line 15 and forced back into the tanks 9 by the surge pumps 3.

As mentioned above, each of the media wheels 27 can be an ALGAEWHEEL®. In an ALGAEWHEEL®, the fins 28 are configured to facilitate growth of a dense mat of algae and function as a mechanical filter. In algae raceways and ponds, algae mats soon become clogged by solids trapped by the algae. Such solids then exclude light from the mat and the algae die. However, by aerating the media wheel 27 and moving the bed of algae through the system water, a scouring action is created causing the solids-loaded filaments to break off exposing new filaments for treatment, growth, and filtering action. Aerating the media wheel 27 and moving the bed of algae through the system water also acts to automatically feed fish slowly throughout the day as the algae can be a food source for some types of fish. Thus, mechanical clogging is avoided and the algae is alternatively exposed to the light, to maintain its growth, and submerged into the water, to provide biological treatment and mechanical filtration.

The present process utilizes micro-algae and macro-algae which are capable of attaching to fixed media, such as the ALGAEWHEEL® 27. The algae sheathes itself in a sticky, gelatinous film capable of seizing and holding solid particles of all types including colloidal material and bacteria. This type of algae is inherent in natural waterways where fish are naturally found.

Adequate amounts of light exposure for the algae can generally be achieved during normal daylight hours. It should be noted, however, that too much light or constant light is harmful to algae, leading to photo-inhibition. The rotation of the wheels 27 in the water treatment unit eliminates this problem by enabling intermittent exposure of the algae to light. Additionally, rotating the wheels 27 enables intermittent submersion into contact with the system water. Such alternate exposure to light and water has been found to promote the growth of algae resulting in the formation of a heavy mat of algae and paraphytic community living off of the algae on the wheel 27. This mat of algae constitutes a biological and mechanical filter removing nutrients biologically and particulate matter mechanically and unloading such material in tightly bound aggregates quite differently from the commonly known flocculent solids.

Referring again to FIGS. 1-5, fresh or saltwater is introduced into an aquaponics facility 100 to fill individual aquaponics tanks 9 with the fresh or salt water to the proper water level 8. Each tank 9 contains a number of wheels 27 sufficient to handle a nutrient load created by a desired amount of aquatic organisms to be raised in the tank 9. For example, each tank 9 can include eight wheels 27. Within each tank 9, the tank flow outlet screen 10 is positioned such that when the tank 9 is filled to the proper water level 8, water flows by gravity through the tank flow outlet screen 10, through the attached tank flow outlet line 11, and to a respective solids removal clarifier 13. Within each solids removal clarifier 13 solids generated by the aquatic organisms and water treatment units in the tanks 9 are settled, separated and removed from the system water. The natural polymer generated by the algae growing on the wheels 27 enhances the ability and efficiency of the clarifiers 13 to settle and remove solids.

Once the solids have been removed, clarified effluent water exits the clarifier 13 through the attached clarifier effluent line 14. Each clarifier 13 has an attached clarifier effluent line 14. Each of the clarifier effluent lines 14 is arranged such that the clarified effluent water flows by gravity to the attached clarified water return line 15 where it is airlifted by the air from the surge pump air supply blower 1 to the surge pumps 3. Each tank 9 has an associated surge pump 3 into which air is supplied by the surge pump air supply blower 1 via the surge pump air supply line 4.

The air supplied by the surge pump air supply blower 1 causes the clarified effluent water in the clarified water return line 15 to return to the tanks 9 in a flow surge manner, alternating between each individual tank 9 in the facility 100. Because the individual tanks 9 are connected to the air supply line 4 in series, the piping layout enables the air supply blower 1 to provide a surge of combined air and water to each individual surge pump 3 in turn without use of any flow control valves.

In an embodiment where the RAS has one air supply line 4 connected to surge pumps 3, the first time the air supply blower 1 forces air through the air supply line 4, the forced air will mix with water and force the combined water and air into the first surge pump 3 on the line 4, which is associated with the first tank 9. The second time the air supply blower forces air through the air supply line 4, the higher water level in the first tank 9 resists the surge from the first surge pump 3. Accordingly, the air supply travels to the second surge pump 3 on the line 4 and forces the combined water and air into the second tank 9. This process is repeated to supply a surge of air and water to each tank 9 in succession. After the surge has been applied to the fourth tank 9, the water level in the first tank 9 has decreased enough to enable the first surge pump 3 on the line 4 to supply a surge to the first tank 9 again.

One advantage of this arrangement of the surge pumps 3 in series on the air supply line 4 is that the intermittent surge of forced air and water into each tank 9 successively causes the return water to be strongly surged into each tank like a wave on a beach. This provides a more natural flow action which increases mixing and aeration in the fish tank and also acts to clear the piping of any buildup of solids and salt at the air-water interface that is typical of continuous flow airlift pumps. Additionally, this arrangement of the surge pumps 3 on the air supply line 4 serves as an emergency overflow. If the fish tank effluent line becomes clogged, water can simply exit back through the surge pump 3. This makes it impossible for any of the tanks 9 to become clogged and overflow in any way. The location of the surge pumps 3 and the effluent piping on the fish tanks 9 also prevents the tanks 9 from being drained even if the external piping cracks or breaks.

As the water in each tank 9 continuously flows through the plurality of wheels 27, the water is brought into contact with living algae, bacteria, and plankton growing on the wheels 27. The bacteria convert organic carbonaceous compounds to $CO_2$. The algae remove nitrogen and phosphorous from the water and convert the $CO_2$ from the bacteria into oxygen and algal biomass. The plankton then feed on the algae, grow and multiply, and become food for fish and shrimp. Thus, the wheels 27 maintain a water quality in the tanks 9 that is suitable for growing the desired species of aquatic organisms.

The solids removed from the clarifiers 13 are collected for use as food for shrimp and plankton. The solids removal process can be easily automated due to the configuration of the aquaponics facility 100. Solids are removed from the system water as previously described and allowed to build up in the clarifiers 13. When the solids have built up to a level requiring removal, an automated removal process can be initiated by the facility operator or by timed cycle interval set by the facility operator.

In an exemplary embodiment of an automated removal process, first, tank flow outlet valves 12, which can be automatic solenoid type valves, are closed to stop flow to the clarifiers 13. Next, clarifier solids drain valves 18, which can be automated solenoid type valves, are opened to drain the clarifiers 13 to a collection container such as a tank. Next, cleaning and makeup water supply line valves 21, which can be automated solenoid type valves, are opened to allow fresh water to flow through a cleaning and makeup water supply line 20 and through a clarifier cleaning spray bar 22 to wash any remaining solids from the clarifiers 13 into the solids collection container. Then, the cleaning and makeup water supply line valves 21 are closed. Next, the clarifier solids drain valves 18 is closed. Next, the cleaning and makeup water supply valves 21 are opened to fill the clarifiers 13 with fresh or salt water depending on whether the facility 100 is a fresh or saltwater aquaponics system. Once the clarifiers 13 are full, the cleaning and makeup water supply valves 21 are closed. Finally, the tank flow outlet valves 12 are opened and the facility 100 is returned to normal operation mode.

The natural polymer generated by the algae has a coagulating effect on the solids which greatly enhances the efficiency of settling in the clarifiers 13. Without the polymer and increased efficiency, the clarifiers 13 could not be used to remove solids from the system water. This is why conventional, bacteria-only based RAS systems must use complex solids removal systems such as dissolved air floatation, sand filters, mechanical media filters, or drum and vacuum screens. Those devices are difficult to operate, have high capital and operational costs, and take up large amounts of space.

In certain embodiments described herein, the wheels 27 employ technology described in U.S. Pat. Nos. 5,647,983; 5,755,961; and 6,158,386, the disclosure of which are all incorporated herein by reference, and particularly the disclosure of the treatment unit 27. One improvement of the invention over the prior art described in U.S. Pat. Nos. 5,647,983; 5,755,961; and 6,158,386 is that fins 28 of the wheels 27 are roughened and corrugated to increase the surface area on which the algae, bacteria, and plankton grow on the fins 28 and allow algae to adhere to the wheels 27 more easily. This feature provides an increase in quantity density of algae, bacteria, and plankton on the wheels 27. As a result, the three-dimensional geometry of each wheel 27 provides an algae growing surface area over ten times the two-dimensional footprint of the wheel 27, giving it a significant advantage over ponds and raceways.

Additionally, movement of the fins 28 into and out of the water provides for efficient gas exchange between the algae, water, and air, and provides a varying intensity of light on the algae. Rotation of the fins 28, and thus the algae, into and out of the water controls the exposure of the algae to alternating periods of light and dark. This ordered mixing of light and darkness prevents photo inhibition of the algae growth, which is associated with continuous exposure to light, and enhances the algal growing cycle.

An additional improvement of the invention over the prior art is that the wheels 27 are supported in the tank 9 by a PVC support piping assembly 23. The support piping assembly 23 supports the wheels 27, enables bearing and rotation of the wheels 27, and provides support and housing for air diffusers 26 which are used to rotate the wheels 27. The fins 28 of the wheels 27 are configured to act as air capture members such that they can be used to rotate the wheels 27 within the water in the tank 9. More specifically, diffused air, provided by the external air blower 2 through the water treatment unit air supply line 6, exits the air diffusers 26 to impinge on the fins 28 to rotate the wheel 27. Thus, the fins 28 are configured to capture an air pocket, generated by the air blower 2, transported by the water treatment unit air supply line 6, and released by the air diffusers 26, between adjacent fins 28 so that the relative buoyancy of the air pocket will move the fins 28 to rotate the wheels 27 as the air pocket rises within the tank. In addition to providing motive force for rotating the wheels 27, the air also introduces oxygen into the water for beneficial reasons explained in more detail herein.

The air bubbles at the air diffuser 26 are further beneficial for the growth of the algae, bacteria, and plankton because the air bubbles foam fractionate the water. This foam collects at the surface of the water where it bears against the fins 28, and more particularly, the algae, bacteria, and plankton growing thereon so that these organisms can readily extract the necessary nutrients and solids within the foam.

In the illustrated embodiment, the wheels 27 include a biological filter media 29 contained within the wheels 27. This media 29 is configured to support bacterial growth. The media 29 can be, for example, plastic bio-balls. The bio-balls are preferably configured to provide a high surface area to volume ratio. As explained above, treatment of the water requires bringing the organic and inorganic compounds within the water into contact with bacterial colonies that use the compounds as food. The water level 8 within the tank 9 is maintained so that the filter media 29 is alternately submerged into and lifted out of the water, which beneficially enhances the transfer of nutrients, oxygen, and $CO_2$ between the bacterial colony and the water.

It can be appreciated that the bacteria growing on the bio-media 29 as well as the algae, bacteria, and plankton growing on the fins 28 form a biomass that can be used as feed to grow shrimp and other crustaceans that feed on this type of biomass. Accordingly, the wheels 27 are configured to enable the algae to be continuously dislodged from the fins 28 and allowed to pass into the clarifiers 13. The air provided through the diffusers 26 can dislodge algae from the fins 28 once the algae reaches a critical mass. Once removed from the fins 28, the algae biomass can either be eaten by the fish, shrimp, or plankton in the tank 9 or withdrawn through the tank flow outlet screen 10. The clarifiers 13 serve as settling tanks for final removal of biomass released from the wheels 27, the biomass consisting of algae, bacteria, and plankton. The algae stripped from the fins 28 of the wheels 27 are filamentous and are coated with a sticky mucous which facilitates the settling of residual solids within the clarifiers 13 by coagulation of the biomass, which also facilities removal.

In one embodiment of the invention, the RAS includes four fish tanks 9, in liquid communication with one another, wherein each of the tanks 9 has fish at a different growth stage. This system allows more fish to be grown than in four separate, individual tanks because the overall weight of fish per wheel 27, and thus the waste generated by the fish and the nutrient loading on the wheels 27 for the connected system is distributed among the four tanks 9. Accordingly, waste generated by the fish and nutrient loading on the wheels 27 can be maximized in the connected system year around by sharing clarified water between the tanks 9.

More specifically, ammonia is generated as a waste product by the fish in the RAS. Ammonia is harmful and toxic to fish when present in the water above a threshold amount. However, ammonia cannot be cleared from the water by the clarifiers 13. Accordingly, the capacity of fish in the RAS is limited by the amount of ammonia generated by the fish in the RAS. Younger and smaller fish produce less ammonia than the same number of older and larger fish. Thus, in the case of four separate, individual tanks 9, the wheels 27 are under nutrient-loaded and the filtration of the RAS is underutilized when the fish are younger and smaller because they need less food and generate less waste. Further, the wheels 27 are over nutrient-loaded and the filtration of the RAS is maxed-out when the fish are older and larger because they need more food and generate more waste.

In contrast, in the connected system, wherein the tanks 9 are in liquid communication with one another, the water treatment units of the tanks 9 with younger, smaller fish have additional capacity to help treat the water in the tanks 9 with older, larger fish. In the connected system, the total amount of ammonia in the RAS is shared between the four tanks 9, because all four tanks 9 are receiving the same clarified water from the shared clarified water return line 15. Thus, the tanks 9 having the younger, smaller fish can take on more waste, including ammonia, than they generate. When the clarified water from each of the four tanks 9 is combined in the common clarified water return line 15 and redistributed through the surge pumps 3, the higher amount of ammonia from the tanks 9 having the older, larger fish is diluted and spread evenly among all four tanks 9.

As an example, in an RAS having four fish tanks 9 and eight wheels 27 in each tank 9, assume that each wheel 27 can handle the nutrient-load and waste products of fifty pounds of fish to maintain the ecological balance of the RAS. Therefore, in a system with four separate, individual tanks, the maximum amount of fish that could be grown per year is 1,600 lbs (4 tanks×8 wheels/tank×50 lb/wheel). This system is under-loaded when the fish are small and is over-loaded when the fish are at harvesting size. However, in a system with four fluidly connected fish tanks 9, if each tank 9 has the same number of fish, but the tanks 9 are staggered with quarterly harvests, each tank could grow 750 lbs of fish per year. In this example, each tank has the same number of fish, but Tank #1 has fingerlings, Tank #2 has 250 lbs of small fish, Tank #3 has 500 lbs of medium fish, and Tank #4 has 750 lbs of large fish. Accordingly, the wheels 27 in the under-loaded tanks help offset the nutrient load and waste products in the over-loaded tanks. Thus, the total weight of fish in the connected tanks at any given time is 1,500 lbs (47 lbs/wheel×8 wheels/tank×4 tanks). However, the total amount fish produced annually by all four tanks is 3,000 lbs, because the tanks 9 share the wheels 27 so the overall net effect is more weight per tank 9 by maximizing the treatment capacity of the wheels 27 in the entire system, all year long. The net effect is doubling the output capacity of the system without increasing the footprint.

As illustrated in the figures, fish tanks 9, for example Tank #1, Tank #2, Tank #3, and Tank #4, are filled with either fresh or saltwater depending on the aquatic species being raised. Each fish tank 9 is fitted with wheels 27 that are supported on plastic stands 23. The height of the support stands 23 is such that the wheels are 25% to 50% submerged. An air blower 1 supplies air to the wheels 27 for rotation, aeration, and mixing. Air diffuser tubing 26 is located strategically under the fins 28 of the wheels 27 to enable the fins 28 to collect the air and cause the wheels 27 to rotate through the water.

Water from each fish tank 9 flows out of the fish tank via an overflow to a settling tank or clarifier 13. Each fish tank 9 has its own settling tank or clarifier 13. Due in part to the production of the natural polymer by the algae, the solids settle efficiently in a relatively short period of time in the clarifiers 13 and are separated from the system water and temporarily stored in the clarifiers 13. The solids remain stored in the clarifiers 13 until they are drained to, for example, shrimp and crab tanks for feeding.

The clarified system water, from which the solids have been removed, then exits each clarifier 13, is combined with the effluent from the other clarifiers 13, and is airlifted back into the fish tanks 9 through a common return line 15. An airlift pump 3 is connected to the common return line 15 for each tank 9. A single air supply line 4 is connected to all of the airlift pumps 3. As a result of this common air supply 4 and water supply 15 connected with individual surge pumps 3, the water is surged into each tank 9 separately at equal, sequenced time intervals. This provides for equal flow split to each fish tank 9 without the use of flow control valves or mechanical flow splitting devices. The common return 15 of clarified water also creates a liquid communication between all tanks 9. As described earlier, this allows the system to double the capacity of fish raised.

What is claimed is:

1. A recirculating aquaculture system for growing aquatic animals, comprising:

an inlet conduit;

a plurality of tanks containing fluid and aquatic animals, each tank of the plurality of tanks in fluid communication with the inlet conduit to receive fluid displaced from the inlet conduit, each tank including a water treatment unit arranged within the tank and including algae, the algae capable of removing aquatic animal waste from the fluid within the tank;

an outlet conduit in fluid communication with each tank of the plurality of tanks and configured to receive displaced fluid from each tank;

a plurality of surge pumps, each surge pump in fluid communication with the inlet conduit, the outlet conduit, and an associated tank of the plurality of tanks; and a plurality of clarifiers, each clarifier fluidly coupled to an associated tank of the plurality of tanks and configured to receive displaced fluid from the associated tank, each clarifier fluidly connected to the outlet conduit; and an air pump configured to force air into each surge pump via the inlet conduit and to mix the air from the inlet conduit and the clarified fluid from the outlet conduit and to displace the mixed air and clarified water through each surge pump and into each tank, wherein each surge pump is configured such that the air pump displaces the mixed air and clarified water through each surge pump and into each tank sequentially.

2. The recirculating aquaculture system of claim 1, wherein:

the water treatment unit of each tank includes:

at least one wheel rotatably supported within the at least one tank and partially submerged within the fluid in the at least one tank such that rotation of the at least one wheel alternately removes a portion of the at least one wheel from the fluid in the at least one tank and submerges the portion of the at least one wheel within the fluid in the at least one tank; and a water treatment unit air supply configured to provide air to the at least one tank to rotate the at least one wheel.

3. The recirculating aquaculture system of claim 2, wherein:

the at least one wheel includes a plurality of fins, the water treatment unit air supply positioned beneath the at least one wheel such that the air supplied to the at least one tank floats upwardly into contact with the plurality of fins to rotate the at least one wheel.

4. The recirculating aquaculture system of claim 3, wherein:

each fin of the plurality of fins is configured to facilitate growth of algae thereon.

5. The recirculating aquaculture system of claim 2, wherein:

the at least one wheel includes a material configured to promote bacterial growth thereon.

6. The recirculating aquaculture system of claim 2, wherein:

rotation of the at least one wheel exposes the portion of the at least one wheel to varying amounts of light.

7. The recirculating aquaculture system of claim 1, wherein: the inlet conduit is configured to receive clarified fluid from each clarifier; and each surge pump is configured to receive clarified fluid form outlet conduit.

8. The recirculating aquaculture system of claim 1, wherein: the outlet conduit is interposed between each clarifier and each surge pump.

9. The recirculating aquaculture system of claim 1, wherein:

each surge pump is configured such that the mixed air and clarified water are distributed evenly to each tank of the plurality of tanks.

10. The recirculating aquaculture system of claim 1, wherein at least one tank of the plurality of tanks contains saltwater.

11. The recirculating aquaculture system of claim 1, wherein said water treatment unit is positioned at the surface of the fluid within said at least one tank and said tank has a depth sufficient to accommodate the aquatic animals beneath said water treatment unit.

12. A method of operating a recirculating aquaculture system for growing aquatic animals, the method comprising:

at least partially filling a plurality of tanks with fluid and aquatic animals;

displacing fluid from each tank into a clarifier;

removing solid waste from the displaced fluid with the clarifier;

displacing clarified fluid from the clarifier into an outlet conduit fluidly coupled to a surge pump for each tank of the plurality of tanks; and applying air to an inlet conduit fluidly coupled to each surge pump to force the air and the displaced clarified fluid into each tank successively, including:

applying air to the inlet conduit to force the air and the displaced clarified fluid into a first tank of the plurality of tanks having a fluid level that is below a predetermined threshold until the fluid level of the first tank has reached the predetermined threshold; and applying air into the inlet conduit to force the air and the displaced clarified fluid into at least one next tank of the plurality of tanks having a fluid level that is below a predetermined threshold until the fluid level of the at least one next tank has reached the predetermined threshold, wherein at least partially filling the plurality of tanks with fluid and aquatic animals includes filling each tank with at least enough fluid and aquatic animals to submerge a portion of a water treatment unit having algae thereon, the algae capable of removing aquatic animal waste from the fluid within the tank.

13. The method of claim 12, further comprising:

rotating the water treatment unit such that the portion having algae thereon is intermittently submerged and removed from the fluid in the tank.

14. The method of claim 12, wherein:

each tank of the plurality of tanks is in liquid communication with each other tank of the plurality of tanks such that an amount of ammonia generated by the aquatic animals in each tank is distributed evenly between each tank of the plurality of tanks.

15. The method of claim 14, wherein:

the aquatic animals in each tank have matured for a length of time, and the length of time for each tank differs from the length of time for each other tank.

16. The method of claim 15, wherein:

the amount of ammonia generated by the aquatic animals in each tank is proportionate to the length of time that the aquatic animals have matured in the respective tank.

17. The method of claim 16, wherein the plurality of tanks includes four tanks.

* * * * *